(12) United States Patent
Peters et al.

(10) Patent No.: US 9,090,195 B2
(45) Date of Patent: Jul. 28, 2015

(54) PARTITION ASSEMBLY FOR A VEHICULAR CARGO AREA

(71) Applicants: Alfred D. Peters, Winkler (CA); Peter Friesen, Winkler (CA)

(72) Inventors: Alfred D. Peters, Winkler (CA); Peter Friesen, Winkler (CA)

(*) Notice: Subject to any disclaimer, the term of this patent is extended or adjusted under 35 U.S.C. 154(b) by 0 days.

(21) Appl. No.: 14/271,582

(22) Filed: May 7, 2014

(65) Prior Publication Data
US 2015/0063938 A1 Mar. 5, 2015

Related U.S. Application Data

(60) Provisional application No. 61/871,430, filed on Aug. 29, 2013.

(51) Int. Cl.
*B60R 13/01* (2006.01)
*B60P 7/14* (2006.01)

(52) U.S. Cl.
CPC ........................................ *B60P 7/14* (2013.01)

(58) Field of Classification Search
CPC .... B60R 13/01; B60R 11/06; B62D 33/0273; B60P 7/14; B60P 3/40
USPC ........... 296/39.2, 183.1, 26.09; 410/129, 151, 410/118, 121, 130, 133, 134, 137, 140, 141, 410/145, 89
See application file for complete search history.

(56) References Cited

U.S. PATENT DOCUMENTS

| 560,893 | A | | 5/1896 | Conant | |
|---|---|---|---|---|---|
| 4,717,298 | A | * | 1/1988 | Bott | 410/129 |
| 4,768,661 | A | * | 9/1988 | Pfeifer | 211/184 |
| 4,889,253 | A | * | 12/1989 | Schmulian et al. | 220/551 |
| D336,062 | S | | 6/1993 | Austin | |
| 5,265,993 | A | | 11/1993 | Wayne | |
| 5,720,507 | A | | 2/1998 | Emery | |
| 6,478,356 | B1 | * | 11/2002 | Wayne | 296/39.2 |
| 6,626,624 | B1 | | 9/2003 | Kopperud | |
| 6,688,821 | B1 | | 2/2004 | Snyder | |
| 6,871,895 | B2 | | 3/2005 | Kiester et al. | |
| 7,413,231 | B1 | * | 8/2008 | Wood et al. | 296/26.11 |

* cited by examiner

*Primary Examiner* — Glenn Dayoan
*Assistant Examiner* — Sunsurraye Westbrook
(74) *Attorney, Agent, or Firm* — Ryan W. Dupuis; Kyle R. Satterthwaite; Ade & Company Inc.

(57) ABSTRACT

A partition assembly is mountable within the cargo area of a vehicle, for example by being vertically slidable at opposing ends into vertical channels formed in opposing side walls of a truck box and the like. The partition assembly includes a first partition member and a second partition member which are coupled to one another by interlocking connection of the respective bodies forming the partition members such that an overall length of the partition assembly is adjustable.

15 Claims, 5 Drawing Sheets

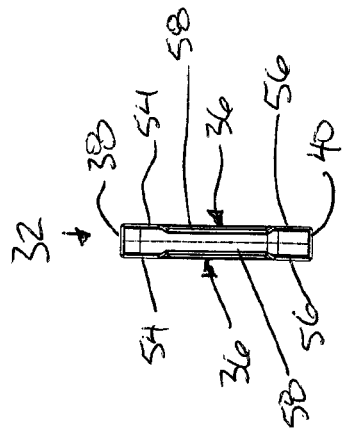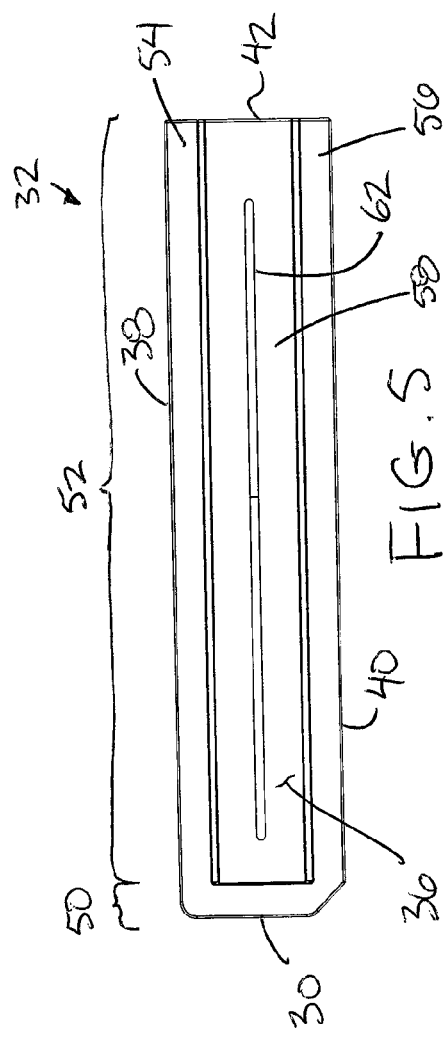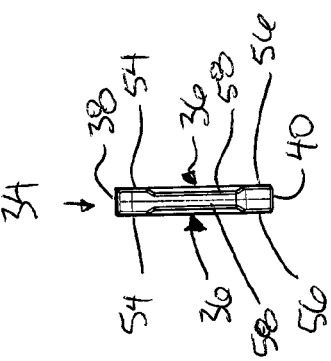

PARTITION ASSEMBLY FOR A VEHICULAR CARGO AREA

This application is claims the benefit under 35 U.S.C. 119(e) of U.S. provisional application Ser. No. 61/871,430, filed Aug. 29, 2013.

FIELD OF THE INVENTION

The present invention relates to a partition assembly which can be mounted in the cargo area of a vehicle, for example between opposing side walls of a truck box, to partition the cargo area, and more particularly the present invention relates to a partition assembly having first and second partition members which are longitudinally slidable relative to one another to adjust an overall length of the partition assembly.

BACKGROUND

One common type of vehicle having a cargo area is a truck having a truck box at a rear end of the vehicle which is defined between two opposing side walls and which is enclosed at a rear end by a tailgate. When carrying smaller cargo, it is known to be desirable to provide a partition in the cargo area to limit the movement of the goods being transported in the cargo area.

Various examples of partition assemblies are disclosed in the following U.S. patents: U.S. Pat. No. 560,893 by Conant; U.S. Pat. No. 5,265,993 by Wayne; U.S. Pat. No. 5,720,507 by Emery; U.S. Pat. No. 6,478,356 by Wayne; U.S. Pat. No. 6,626,624 by Kopperud; U.S. Pat. No. 6,688,821 by Snyder; U.S. Pat. No. 6,871,895 by Kiester et al; and Des. 336,062 by Austin. The prior art designs are either limited to a fixed length which cannot be adapted to different vehicle types, or provided an adjustment mechanism which is complex and thus unnecessarily costly to manufacture or purchase.

SUMMARY OF THE INVENTION

According to one aspect of the invention there is provided a partition assembly in combination with a cargo area defined between a pair of opposed side walls of a vehicle, the partition assembly comprising:

a first partition member comprising a first body extending in a longitudinal direction between an inner end and an opposing outer end of the first partition member;

a second partition member comprising a second body extending in the longitudinal direction of the first partition member between an inner end of the second partition member and an outer end of the second partition member;

the first and second partition members being coupled to one another by interlocking connection of the first and second bodies such that:

an overall length of the partition assembly is defined between the outer end of the first partition member and the outer end of the second partition member; and the first and second partition members are slidable relative to one another in the longitudinal direction to vary the overall length.

Preferably the first and second bodies each comprise a unitary plastic body spanning between the respective inner and outer ends thereof. In this instance, the relative sliding movement of the first and second partition members may be dictated solely by the interlocking connection of the first and second bodies.

By providing only two partition members which are telescopic relative to one another to adjust the overall length, a simple yet effective partition assembly is described herein which overcomes many deficiencies in the prior art.

Preferably the partition assembly further comprises a locking element cooperative with the first and second partition members and operable to retain the first and second partition members relative to one another at a fixed overall length. When the locking element comprises a locking fastener, preferably the first partition member includes a longitudinally extending slot formed therein and the second partition member includes a fastener aperture therein in alignment with the slot so as to be arranged to receive the locking fastener therein.

Preferably the partition assembly consists solely of the unitary plastic body of the first partition member, the unitary plastic body of the second partition member, and the locking element.

In the preferred embodiment, the first partition member comprises a hollow passage extending in the longitudinal direction between an opening at the inner end and the opposing outer end such that the inner end of the second partition member is longitudinally slidable within the hollow passage of the first partition member.

Preferably the hollow passage in the first partition member occupies substantially a full height and a full width of the first partition member along a length of the first partition member in the longitudinal direction, and the inner end of the second partition member occupies substantially a full height and a full width of the hollow passage in the first partition member within which it is received.

When the second body of the second partition member includes an outer end portion adjacent the outer end thereof and a main portion spanning longitudinally between the inner end and the outer end portion, preferably the outer end portion has at least one outer dimension transverse to the longitudinal direction which is greater than a corresponding interior dimension of the hollow passage.

Preferably the outer end portion of the second partition member has an overall width perpendicular to the longitudinal direction which is approximately equal to an overall width perpendicular to the longitudinal direction of the first partition member adjacent the outer end thereof.

The second body of the second partition member may also include a hollow interior spanning longitudinally between the inner end and the outer end thereof.

Preferably the first partition member and the second partition member are substantially equal in length between the respective inner end and the respective outer end relative to one another.

Preferably each of the first and second bodies of the first and second partition members includes a main portion having a uniform cross section perpendicular to the longitudinal direction which spans a majority of an overall length of the respective partition member from the inner end towards the outer end thereof.

The main portion of each partition member may comprise a pair of side walls which are spaced apart to define a hollow interior therebetween in which each side wall of each partition member includes i) an upper rail portion adjacent a top side, ii) a lower rail portion adjacent a bottom side, and iii) an intermediate portion spanning between the upper and lower rail portions. Preferably the intermediate portions of the side walls within each partition member are closer to one another than the upper rail portions and the lower rail portions of the respective side walls.

In some instances, the cargo area includes a pair of vertical channels integrally formed at laterally opposing sides thereof in which the vertical channels are arranged to receive respective ones of the opposing outer ends of the partition members therein for vertical sliding movement.

In other instances, two auxiliary pocket members are provided including a main body portion and a vertical channel portion in which the main body portions are selectively mountable on opposing sides of the cargo area such that the vertical channels are arranged to receive respective ones of the opposing outer ends of the partition members therein for vertical sliding movement.

One embodiment of the invention will now be described in conjunction with the accompanying drawings in which:

BRIEF DESCRIPTION OF THE DRAWINGS

FIG. 5 is a front elevational view of the first partition member of the partition assembly;

FIG. 6 is an end view of the first partition member;

FIG. 7 is a front elevational view of the second partition member of the partition assembly;

FIG. 8 is a top plan view of the second partition member;

In the drawings like characters of reference indicate corresponding parts in the different figures.

DETAILED DESCRIPTION

Figure 1:
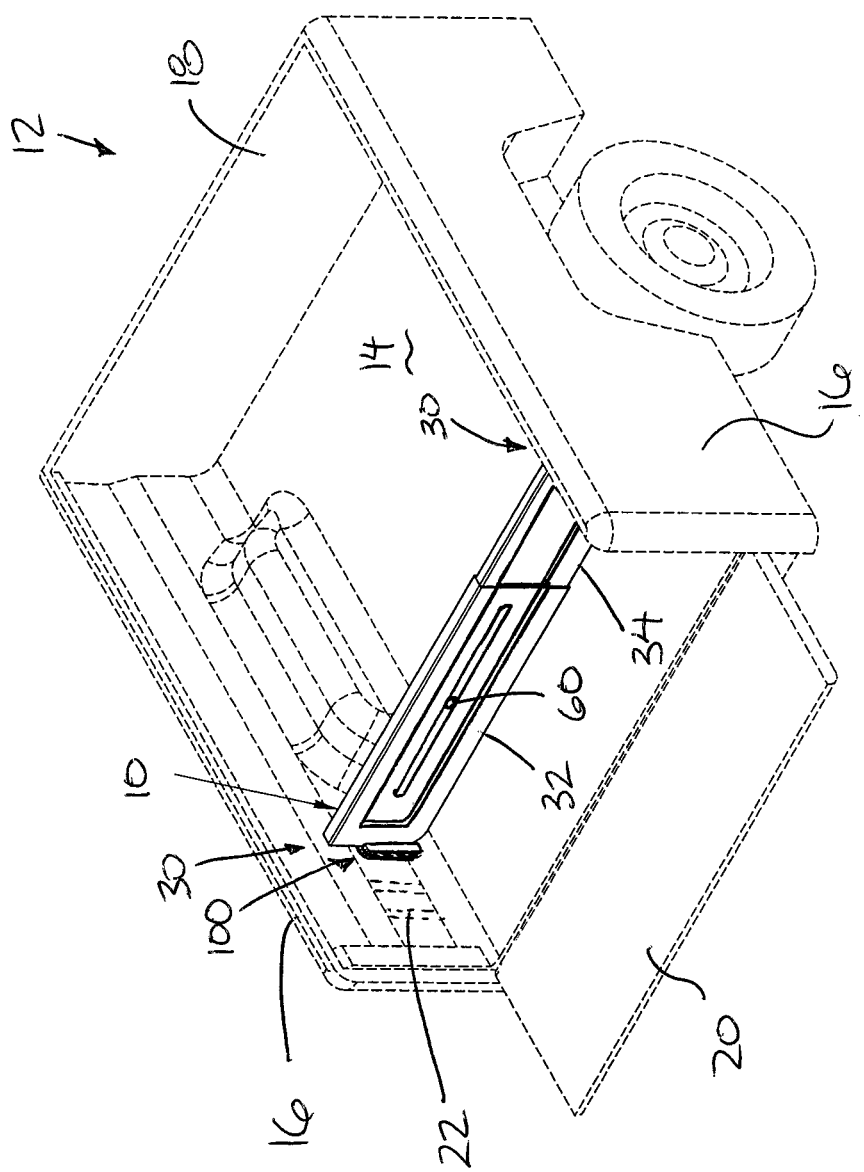
FIG. 1 is a perspective view of the partition assembly in a mounted position within the cargo area of a vehicle.
Figure 2:
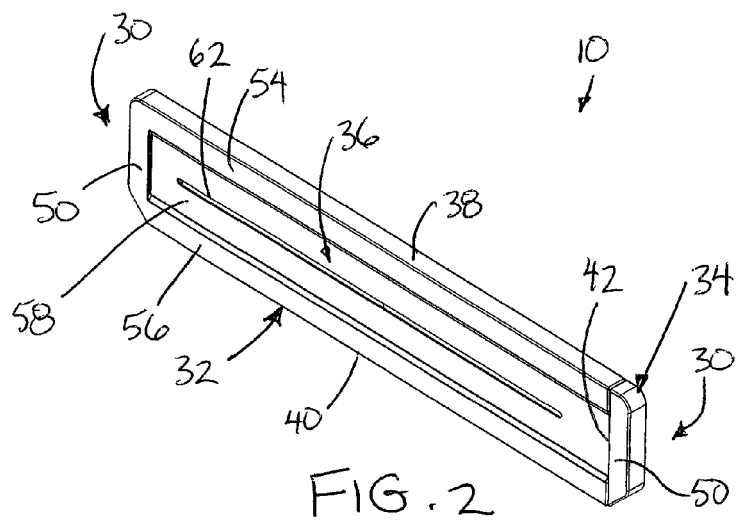
FIG. 2 is a perspective view of the partition assembly in an extended position.
Figure 3:
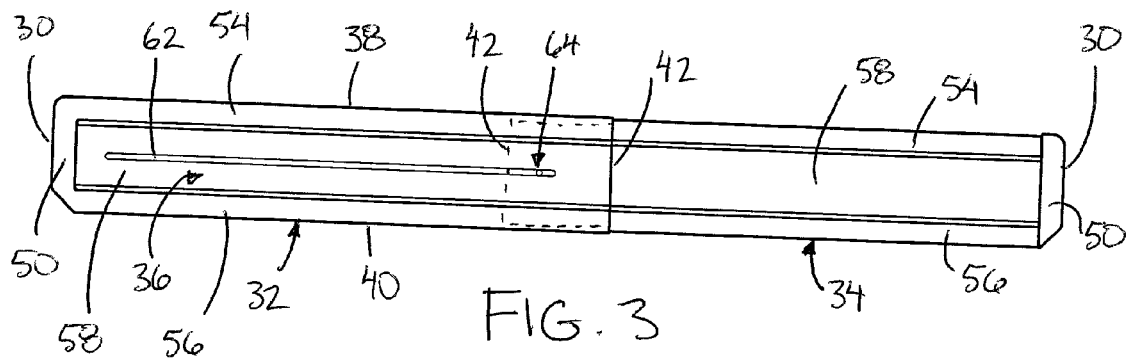
FIG. 3 is a front elevational view of the partition assembly in the extended position.
Figure 4:
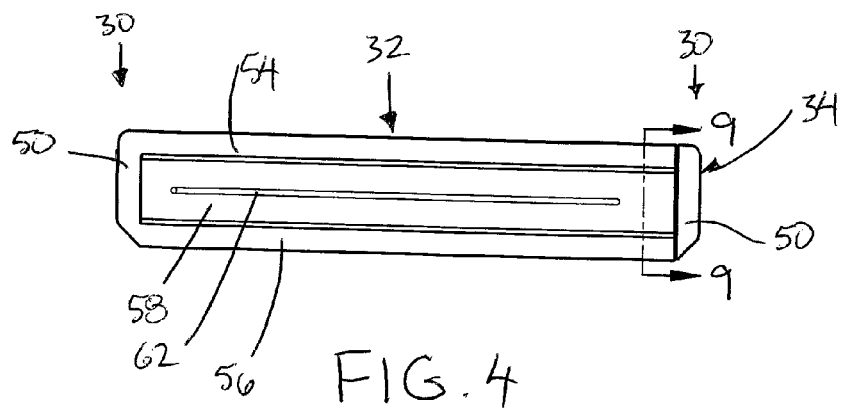
FIG. 4 is a front elevational view of the partition assembly in a retracted position.
Figure 9:
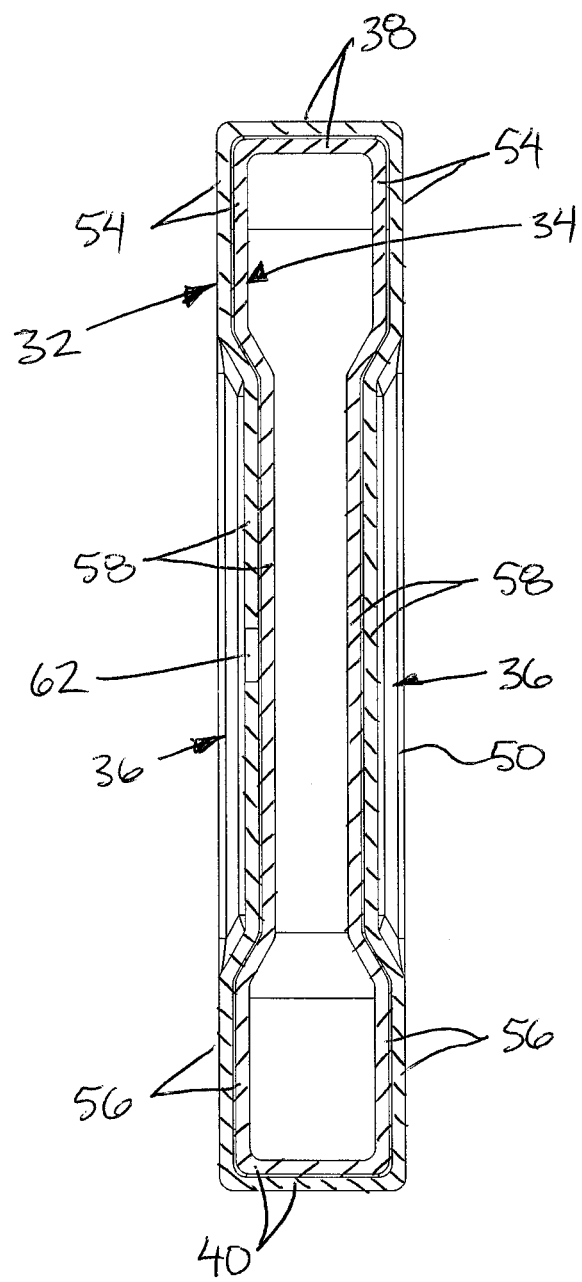
FIG. 9 is a sectional view along the line 9-9 of FIG. 4.
Figure 10:
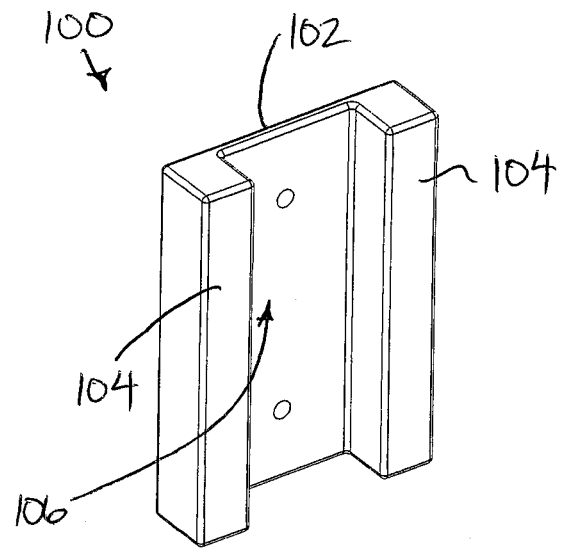
FIG. 10 is a perspective view of an auxiliary pocket member for mounting within the cargo area of the vehicle as shown in FIG. 1.
Figure 11:
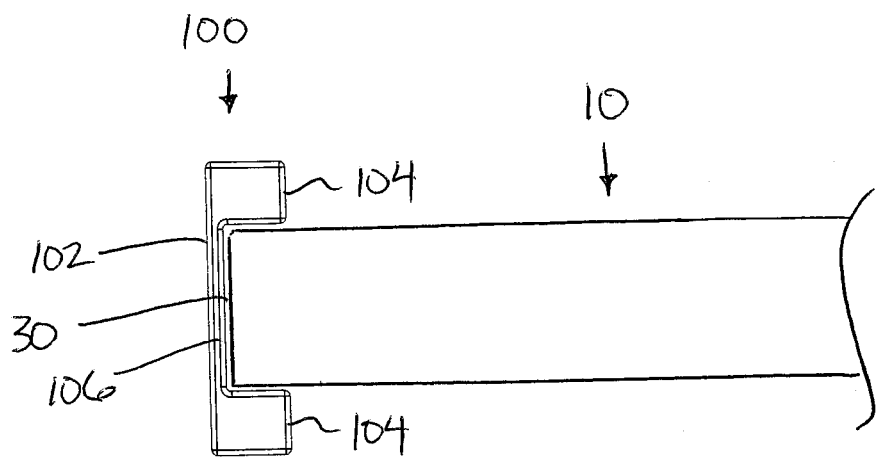
FIG. 11 is a top view of the pocket member according to FIG. 10.

Referring to the accompanying figures, there is illustrated a partition assembly generally indicated by reference numeral 10. The assembly 10 is particularly suited for the cargo area 12 of a vehicle, for example, the truck box of a passenger pick-up truck.

The cargo area 12 typically comprises a rectangular floor 14, having two sidewalls 16 extending upwardly from laterally opposed longitudinal edges of the floor. A front wall 18 is connected between the two side walls at the front end of the cargo area and a tailgate 20 is typically pivotally connected at the rear edge of the floor. the tailgate is pivotal between an open position in which the area between the two side walls is unobstructed at the rear by the tailgate which is substantially coplanar with the floor and a closed position in which the tailgate is in an upright orientation connected between the two side walls for enclosing the rear end of the cargo area.

Pockets 22 are formed at the two opposing sides of the cargo area in alignment with one another either by being formed integrally into the sidewall of the truck box or integrally within a liner received within the cargo area. Each pocket comprises a generally vertical channel of suitable dimension for receiving commercially available dimensional lumber therein. For example, the two opposed pockets may each comprise a vertical channel having a horizontal width of approximately 1.5 inches so that the two pockets receive opposing ends of a commercially available 2×12 spanning therebetween in an upright orientation and which is cut to length corresponding to the width of the cargo area between the side walls.

Alternatively, if the side walls of the cargo area or the cargo area liner do not include integrally formed pockets, two auxiliary pocket members 100 may be provided for selective mounting to opposing side walls of the cargo area. Each pocket member 100 is a unitary, hollow, plastic body having a flat rear side 102 defining a main body portion suitable for fastening against a vertical supporting surface. The front side of the pocket member 100 comprises two vertical ribs 104 which are spaced apart to define a vertical channel 106 therebetween. The width of the channel is suitable to receive the width of one of the outer ends of the partition assembly vertically slidable therein. When the main body portions are selectively mounted on opposing sides of the cargo area, the vertical channels are thus arranged to receive respective ones of the opposing outer ends of the partition members therein for vertical sliding movement.

The partition assembly 10 is arranged for mounting between the two side walls of the cargo area by providing two opposed outer ends 30 arranged to be received in the two pockets 22 respectively so that the partition assembly spans therebetween in place of the dimensional lumber.

The partition assembly generally includes a first partition member 32 and a second partition member 34 which are coupled to one another such that the overall length in the longitudinal direction of the assembly between the two opposed outer ends 30 is adjustable.

Each partition member 32 and 34 comprises a hollow member moulded of plastic material such that each member is a single, seamless, unitary moulded piece of plastic.

More particularly, each partition member is moulded to include two opposed side walls 36 which are generally parallel and spaced apart from one another to span a full height and a full length of the partition member. A top wall 38 spans between the top edges of the two side walls of each partition member and a bottom wall 40 similarly spans between the bottom edges of the side walls of each partition member. The two partition members are similar in length in the longitudinal direction and each member extends longitudinally inward from the respective outer end 30 towards the respective inner end 42.

Each partition member is open at the inner end 42 such that the hollow interior of the first partition member comprises a hollow passage spanning the full height between the top and bottom walls, spanning the full width between the two side walls, and spanning the full length in the longitudinal direction between the respective inner and outer ends.

The outer dimensions of the second partition member including the width between the side walls and the height between the top and the bottom walls is approximately equal to the corresponding interior dimensions of the first partition member such that the second partition member substantially fully occupies the interior dimensions of the hollow passage in the first partition member.

The second partition member remains slidable relative to the first partition member in the longitudinal direction such that the telescoping relationship therebetween permits the overall length between the two opposing outer ends to be adjusted between a fully retracted position which is less than the width of the cargo area and a fully extended position which is greater than the width of the cargo area.

Each partition member is a unitary plastic hollow body which is formed to include an outer end portion 50 in proximity to the outer end 30 thereof and a main portion 52 which spans the majority of the length of the partition member from the inner end 42 to the outer end portion 50 at the outer end. The cross section of the partition member taken along a plane perpendicular to the longitudinal direction thereof remains consistent along the full length of the main portion 52 which occupies substantially the majority of the overall length of the partition member.

More particularly, the cross section of the main portion 52 is arranged such that each side wall 36 is formed to define an upper rail portion 54, a lower rail portion 56 and an intermediate portion 58 spanning vertically between the upper and lower rail portions. Within each partition member, the upper rail portions 54 of the side walls and the lower rail portions of the side walls are uniformly spaced apart by a first distance in parallel and spaced apart relation. The intermediate portions 58 are also parallel and spaced apart but are recessed inwardly relative to the respective rail portions such that the intermediate portions of the two side walls of each partition member are spaced apart by a second distance which is less than the first distance of the respective rail portions. The first and second distances defining the width perpendicular to the longitudinal direction of the second partition member are less than the corresponding width dimensions of the first partition member.

In the first partition member, the two opposing side walls 36 at the outer end portion are spaced apart by the same first distance as the upper and lower rail portions such that the upper and lower rail portions as well as the outer end portion of the first partition member define the maximum thickness perpendicular to the longitudinal direction of the overall partition assembly.

At the outer end portion 50 of the second partition member 34 the two side walls are spaced apart by a distance which is greater than the remaining main portion 52 of the second partition member so as to be equal in width to the maximum width defined by the outer end portion 50 and rail portions of the first partition member 32. Accordingly, the width of the partition member at each of the two opposed outer ends 30 are equal to one another and correspond to the lateral width of the vertical channel of the pocket members 100 or the pockets 22 of the cargo area.

A locking element is provided in the form of a locking fastener 16 which can be used for cooperation with the first and second partition members to lock and fix the position thereof relative to one another at a selected overall length. To simplify the fastening of the locking fastener 60, a slot 62 is provided in the first partition assembly which spans nearly the full length of one side wall to span in the longitudinal direction. An aperture 64 is provided in the side walls of the second partition member for alignment with the slot 62 to permit a fastener to be inserted into the aperture 64 by first inserting through the slot 62 to reach the aperture. The fastener 60 can be inserted fully through both partition members by forming a hole in the other side wall of the first partition member which aligns with the apertures 64 in the second partition member at the prescribed overall length which is desired to fit within the cargo area of the user.

The partition assembly 10 is most advantageous over prior art arrangements in that a simple, low cost structure is provided by the two hollow partition members which are coupled to one another for relative sliding movement in the longitudinal direction solely by the mating and interlocking shapes of the moulded hollow bodies. More particularly the complimentary outer dimensions of the second partition member which fit within the interior dimensions of the hollow passage of the first partition member serve as the sole basis for coupling the partition members to restrict the relative movement therebetween to a longitudinal sliding movement which adjusts the overall length between the two opposed outer ends of the assembly. The addition of a single locking fastener 60 is sufficient to fix the overall length at a desired length corresponding to the width of the cargo area of the user, with the resulting dimensions of the partition assembly corresponding approximately to the width and height of a conventional 2×12 dimensional lumber which has been cut to length to fit within the cargo area.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A partition assembly for use in combination with a cargo area defined between a pair of opposed side walls of a vehicle, the partition assembly comprising:
    a first partition member comprising a first body which is elongate in a longitudinal direction between an inner end and an opposing outer end of the first partition member; and
    a second partition member comprising a second body which is elongate in said longitudinal direction of the first partition member between an inner end of the second partition member and an outer end of the second partition member;
    the first and second partition members being coupled to one another so as to be slidable relative to one another in said longitudinal direction by an interlocking connection between the first and second bodies such that:
        an overall length of the partition assembly is defined in said longitudinal direction between the outer end of the first partition member and the outer end of the second partition member; and
        said overall length in the longitudinal direction is adjustable to a prescribed length that corresponds to an overall width of the cargo area of the vehicle between the side walls of the cargo area.

2. The partition assembly according to claim 1 wherein the first and second bodies each comprise a unitary plastic body spanning between the respective inner and outer ends thereof, and wherein the relative sliding movement of the first and second partition members is dictated solely by the interlocking connection of the first and second bodies.

3. The partition assembly according to claim 1 further comprising a locking element cooperative with the first and second partition members and operable to retain the first and second partition members relative to one another at a fixed overall length.

4. The partition assembly according to claim 3 wherein the locking element comprises a locking fastener, the first partition member includes a longitudinally extending slot formed therein, and the second partition member includes a fastener aperture therein in alignment with the slot so as to be arranged to receive the locking fastener therein.

5. The partition assembly according to claim 3 the first and second bodies each comprise a unitary plastic body spanning between the respective inner and outer ends thereof, and wherein the partition assembly consists solely of the unitary plastic body of the first partition member, the unitary plastic body of the second partition member, and the locking element.

6. The partition assembly according to claim 1 wherein the first partition member comprises a hollow passage extending in the longitudinal direction between an opening at the inner end and the opposing outer end, and wherein the inner end of the second partition member is fully received in the hollow passage so as to be longitudinally slidable within the hollow passage of the first partition member.

7. The partition assembly according to claim 6 wherein the hollow passage in the first partition member occupies substantially a full height and a full width of the first partition member along a length of the first partition member in the longitudinal direction and wherein the inner end of the second partition member occupies substantially a full height and a full width of the hollow passage in the first partition member within which it is received.

8. The partition assembly according to claim 6 wherein the second body of the second partition member includes an outer end portion adjacent the outer end thereof and a main portion spanning longitudinally between the inner end and the outer end portion, the outer end portion having at least one outer dimension transverse to the longitudinal direction which is greater than a corresponding interior dimension of the hollow passage.

9. The partition assembly according to claim 8 wherein the outer end portion of the second partition member has an overall width perpendicular to the longitudinal direction which is approximately equal to an overall width perpendicular to the longitudinal direction of the first partition member adjacent the outer end thereof.

10. The partition assembly according to claim 1 wherein the second body of the second partition member includes a hollow interior spanning longitudinally between the inner end and the outer end of the second partition member.

11. The partition assembly according to claim 1 wherein the first partition member and the second partition member are substantially equal in length between the respective inner end and the respective outer end relative to one another.

12. The partition assembly according to claim 1 wherein each of the first and second bodies of the first and second partition members respectively includes a main portion having a uniform cross section perpendicular to the longitudinal direction, the main portion spanning a majority of an overall length of the respective partition member from the inner end towards the outer end thereof.

13. The partition assembly according to claim 12 wherein the main portion of each partition member comprises a pair of side walls which are spaced apart to define a hollow interior therebetween, each side wall of each partition member including an upper rail portion adjacent a top side, a lower rail portion adjacent a bottom side, and an intermediate portion spanning between the upper and lower rail portions, the intermediate portions of the side walls within each partition member being closer to one another than the upper rail portions and the lower rail portions of the respective side walls.

14. The partition assembly according to claim 1 in combination with the cargo area of the vehicle, the cargo area including a pair of vertical channels integrally formed at laterally opposing sides thereof, the vertical channels being arranged to receive respective ones of the opposing outer ends of the partition members therein for vertical sliding movement in a direction which is perpendicular to said longitudinal direction.

15. The partition assembly according to claim 1 in combination with a pair of auxiliary pocket members, each including a main body portion and a vertical channel portion, the main body portions being selectively mountable on opposing sides of the cargo area such that the vertical channels are arranged to receive respective ones of the opposing outer ends of the partition members therein for vertical sliding movement in a direction which is perpendicular to said longitudinal direction.

* * * * *